United States Patent [19]

Shimomukai

[11] Patent Number: 5,757,548
[45] Date of Patent: May 26, 1998

[54] KALEIDOSCOPE, AND PATTERN GENERATING APPARATUS AND PATTERN GENERATING METHOD UTILIZING THE SAME

[76] Inventor: Yoshihito Shimomukai, 5-10, 7-Chome, Nakayamasakuradai, Takarazuka-shi, Hyogo 665, Japan

[21] Appl. No.: 601,099

[22] Filed: Feb. 14, 1996

[30] Foreign Application Priority Data

Feb. 14, 1995 [JP] Japan ................... 7-050593

[51] Int. Cl.⁶ ........................... G03B 27/52
[52] U.S. Cl. ........................... 359/616; 396/429
[58] Field of Search ................ 359/616, 617; 354/76, 77; 396/429–354

[56] References Cited

U.S. PATENT DOCUMENTS

| | | | |
|---|---|---|---|
| 1,518,204 | 12/1924 | Husted. | |
| 3,482,896 | 12/1969 | Bogosian | 350/4 |
| 3,809,879 | 5/1974 | Gonzalez | 240/3.1 |
| 3,930,711 | 1/1976 | Powell | 350/4 |
| 4,475,126 | 10/1984 | Akins | 358/250 |
| 4,820,004 | 4/1989 | Briskin | 350/4.1 |
| 5,223,889 | 6/1993 | Mouner | 359/616 |
| 5,475,532 | 12/1995 | Sandoval et al. | 359/616 |

FOREIGN PATENT DOCUMENTS

| | | |
|---|---|---|
| 1 096 789 | 6/1955 | France. |
| 1-36171 | 11/1989 | Japan. |

*Primary Examiner*—Daniel P. Malley
*Attorney, Agent, or Firm*—Marshall, O'Toole, Gerstein, Murray & Borun

[57] ABSTRACT

The present invention provides for a kaleidoscope which creates a newest ever pattern, and a pattern generating apparatus and a pattern generating method utilizing such a kaleidoscope. A tip-cut polygonal cone cylinder 1 has both ends 1a and 1b open and peripheral surfaces formed by plate members 1A whose wall surfaces are mirror surfaces. A film printing an object is disposed at an opening of a leading end which serves as a cut tip surface 1F having a small cross sectional area, the film is irradiated from behind, and the object is viewed through an opening of a rear end of the tip-cut polygonal cone cylinder. The cut tip surface 1F is an inclined surface which is inclined with respect to the longitudinal direction of the tip-cut polygonal cone cylinder 1.

6 Claims, 17 Drawing Sheets

KALEIDOSCOPE, AND PATTERN GENERATING APPARATUS AND PATTERN GENERATING METHOD UTILIZING THE SAME

BACKGROUND OF THE INVENTION

1. Field of the Invention

The present invention relates to a kaleidoscope, and more particularly, to a kaleidoscope which is useful to create a variety of new designs which have never been created, for patterns of a wrapping paper, a fabric such as clothes and a tie, patterns for posters, etc.

2. Description of the Background Art

Various kaleidoscopes have been made in Japan, as "a tool for playing," and various kaleidoscopes having new structures for creating new images (i.e., patterns) have been provided for.

A kaleidoscope disclosed in Japanese Utility Model Publication No. 1-36171 has the structure which is close to that of the present invention.

The No. 1-36171 kaleidoscope is a tip-cut triangle cone cylinder with both ends open, which is defined by plate-like peripheral surfaces, and inner surfaces of plate members are mirror surfaces. An object is disposed in front of an opening at a leading end having a small cross sectional area. A rear end serves as a peeping window.

When a person looks into such a kaleidoscope, with a point of view located within the tip-cut triangle cone cylinder, since the object is repeatedly reflected at the mirror surfaces of the respective surfaces, the person sees "a spherical polygon pattern which is formed by connecting triangles," i.e., the actual object with its virtual images expanding around the same.

However, the structure as above only creates a spherical polygon pattern which has flat surfaces, (e.g., having no projections extending outward from the surface of the spherical pattern) which is not basically very different from a pattern which is created by a traditional kaleidoscope.

In addition, in the case of the No. 1-36171 patent, since the plate-like mirrors which form the tip-cut triangle cone cylinder are regular mirrors, that is, mirrors in which mirror surfaces are formed on outer surfaces of glass plates so that the mirror surfaces are directed inward, the periphery of the object as it is developed is repeatedly reflected both on the inner surfaces and the mirrored outer surfaces therefore the repeatedly reflected images are degraded as if they are "defocused," and frame lines are formed at the peripheries of each reflected image. This gives a viewer a strong impression that the design of a resultant pattern is poorly obtained by repeatedly reflecting the object at the mirror surfaces. Thus, it is not possible to create a dynamic and new pattern.

SUMMARY OF THE INVENTION

The present invention has been made to solve the problems above. Accordingly, an object of the present invention is to provide for a kaleidoscope which creates a newest-ever pattern, a pattern generating apparatus and a pattern generating method utilizing such a kaleidoscope.

A kaleidoscope according to the present invention is formed as a tip-cut polygonal cone cylinder with both ends open and peripheral surfaces formed by plate members whose wall surfaces are mirror surfaces, requires to dispose a film printing an object at an opening of a leading end which serves as a cut tip surface and has a small cross sectional area, to irradiate the film from the back side, and to view the object through an opening of a rear end of the tip-cut polygonal cone cylinder, and is characterized in that the cut tip surface is an inclined surface which is inclined with respect to the longitudinal direction of the tip-cut polygonal cone cylinder. The inclination of the cut tip surface generates projections which extend outward from the periphery of the generated spherical pattern.

In the kaleidoscope, if mirror surfaces are formed on inner wall surfaces of the tip-cut polygonal cone cylinder, it is possible to obtain a new and dynamic pattern with developed objects having clear peripheries and without frame lines at the peripheries.

In the kaleidoscope, if the inclined surface is formed by a curved surface which is warped in the form of a recess in the direction of inclination, patterns which are developed because of reflection at the mirror surfaces have a semispherical shape (which is similar to a bowl turned upside down).

In the kaleidoscope, if the inclined surface is formed by a curved surface which is warped in the form of a convex in the direction of inclination, patterns which are developed because of reflection at the mirror surfaces have a polygonal tower shape (a hexagonal tower shape if the tip-cut polygonal cone cylinder is a tip-cut triangle cone cylinder, because of adjacent patterns).

Further, pattern generating apparatus is characterized in utilizing the kaleidoscope and including, adhering means for adhering a film is disposed on the inclined surface of the kaleidoscope, illuminating means which is movable and whose illumination is adjustable is disposed behind the adhering means, and photographing means is disposed which is movable in the longitudinal direction of the kaleidoscope at the opening of the rear end of the kaleidoscope.

Alternatively, in the pattern generating apparatus, the adhering means is constructed so as to adhere the film to the cut tip surface while rotating or moving the film, and the object is freely movable, so that it is easy to obtain a more variable pattern.

The pattern generating method utilizing the pattern generating apparatus is characterized in that the film printing the object which serves as an original of a pattern to be created is adhered onto the adhering means of the kaleidoscope, a person looks into through the photographing means which is disposed at the opening of the rear end of the kaleidoscope, the illuminating position and illumination intensity of the illuminating means which is disposed behind the photographing means is adjusted until reaching a desired lighting condition, the film print in the rotatable, movable adhering means is rotated or moved until finding a desired kaleidoscope pattern, and then the desired kaleidoscope pattern is photographed, whereby a film print of the desired pattern is created.

In the pattern generating method, the tip-cut polygonal cone cylinder is a tip-cut triangle cone cylinder and a lens of the photographing means is a wide angle lens so that a spherical pattern with projections on the periphery is created.

Further, in the pattern generating method, the tip-cut polygonal cone cylinder is a tip-cut triangle cone cylinder and a lens of the photographing means is a wide angle lens which has a small field angle (i.e., a wide angle lens which is similar to a standard lens) or a standard lens so that a repetitive pattern is created in which projection patterns are formed toward peripheral lines from the center of a screen at the center.

Hence, in the kaleidoscope, when a person looks into while placing the point of view in the vicinity of the opening of the rear end, the person sees a spherical pattern in which projection patterns such as hexagonal patterns and semi-spherical patterns are formed on the periphery. When the tip-cut polygonal cone cylinder is a tip-cut rectangle cone cylinder, a cylindrical pattern (a pattern like a collapsible paper lantern) is created in which webs are formed in the longitudinal direction on each pattern which is reflected at the respective mirror surfaces.

In the pattern generating apparatus, when a camera equipped with a wide angle lens is disposed as the photographing means at the opening of the rear end of the kaleidoscope, in accordance with the field angle of the wide angle lens, if the wide angle lens of about 90 mm is disposed in a 4×5 camera, for example (which corresponds to a wide angle lens of about 18 mm for a 35-mm camera), a spherical pattern is created in which polygonal cone projection patterns (The number of apexes of the polygon is twice the number of apexes of the tip-cut polygonal cone cylinder) or semi-spherical projection patterns are formed on the periphery. When the tip-cut polygonal cone cylinder is a tip-cut rectangle cone cylinder, an approximately spherical pattern is created in which webs (binding) are formed in the longitudinal direction on each pattern which is reflected at the respective mirror surfaces.

On the other hand, if the field angle of the wide angle lens is such a degree corresponding to a wide angle lens of about 120 mm for a 4×5 camera (which corresponds to a wide angle lens of about 35 mm for a 35-mm camera), a partially spherical pattern (a portion of a sphere) is created in which polygonal cone projection patterns (The number of apexes of the polygon is twice the number of apexes of the tip-cut polygonal cone cylinder) or semi-spherical projection patterns are formed on the periphery. When the tip-cut polygonal cone cylinder is a tip-cut rectangle cone cylinder, a partially cylindrical pattern (a pattern like a collapsible paper lantern) is created in which webs are formed in the longitudinal direction on each pattern which is reflected at the respective mirror surfaces.

In the structure as described above, a new pattern with varying brightness is created by changing the position and the intensity of illumination of the illuminating means.

In the pattern generating method, when the photographing means is disposed at the opening of the rear end of the kaleidoscope, in accordance with the field angle of the wide angle lens, if the wide angle lens of about 90 mm is disposed in a 4×5 camera, for example (which corresponds to a wide angle lens of about 18 mm for a 35-mm camera), a spherical pattern is created in which polygonal cone projection patterns (The number of apexes of the polygon is twice the number of apexes of the tip-cut polygonal cone cylinder) or semi-spherical projection patterns are formed on the periphery. When the tip-cut polygonal cone cylinder is a tip-cut rectangle cone cylinder, a spherical pattern is created in which webs (binding) are formed in the longitudinal direction on each pattern which is reflected at the respective mirror surfaces.

On the other hand, if the field angle of the wide angle lens is such a degree corresponding to a wide angle lens of about 120 mm for a 4×5 camera (which corresponds to a wide angle lens of about 35 mm for a 35-mm camera) or a standard lens of about 180 mm for a 4×5 camera (which corresponds to a wide angle lens of about 35 mm for a 50-mm camera), a partially spherical pattern (a portion of a sphere) is created in which polygonal cone projection patterns (The number of apexes of the polygon is twice the number of apexes of the tip-cut polygonal cone cylinder) or semi-spherical projection patterns are formed on the periphery. When the tip-cut polygonal cone cylinder is a tip-cut rectangle cone cylinder, a partially spherical pattern (i.e., a curved-face like pattern) is created in which webs are formed in the longitudinal direction on each pattern which is reflected at the respective mirror surfaces.

That is, in the generating pattern generating apparatus and the generating pattern generating method, it is possible to obtain a pattern with a clear periphery but without a frame line, which gives a dynamic impression, as that shown in FIGS. 7 to 18.

These and other objects, features, aspects and advantages of the present invention will become more apparent from the following detailed description of the present invention when taken in conjunction with the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 1A is a side view, FIG. 1B is a front view of the kaleidoscope viewed from the direction of a line b—b (i.e., from the front), and FIG. 1C is a rear view of the kaleidoscope viewed from the direction of a line c—c (i.e., from behind);

DESCRIPTION OF THE PREFERRED EMBODIMENTS

In the following, a specific description will be given on a kaleidoscope according to the present invention and a generating pattern generating apparatus utilizing the same, with reference to the drawings. A generating pattern generating method using the same will be also described specifically.

Figure 1C:
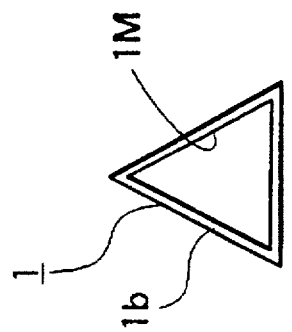
FIGS. 1A to 1C are views showing the structure of a kaleidoscope according to a preferred embodiment of the present invention, to be specific.
Figure 1B:
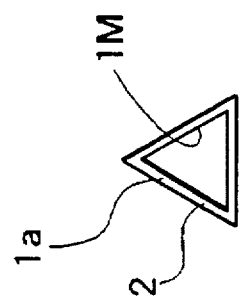
Figure 1A:
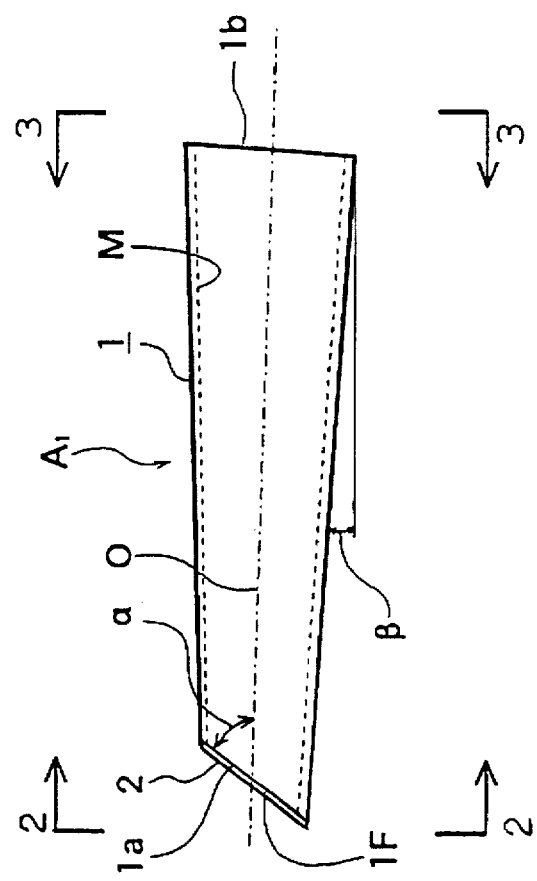
Figure 2:
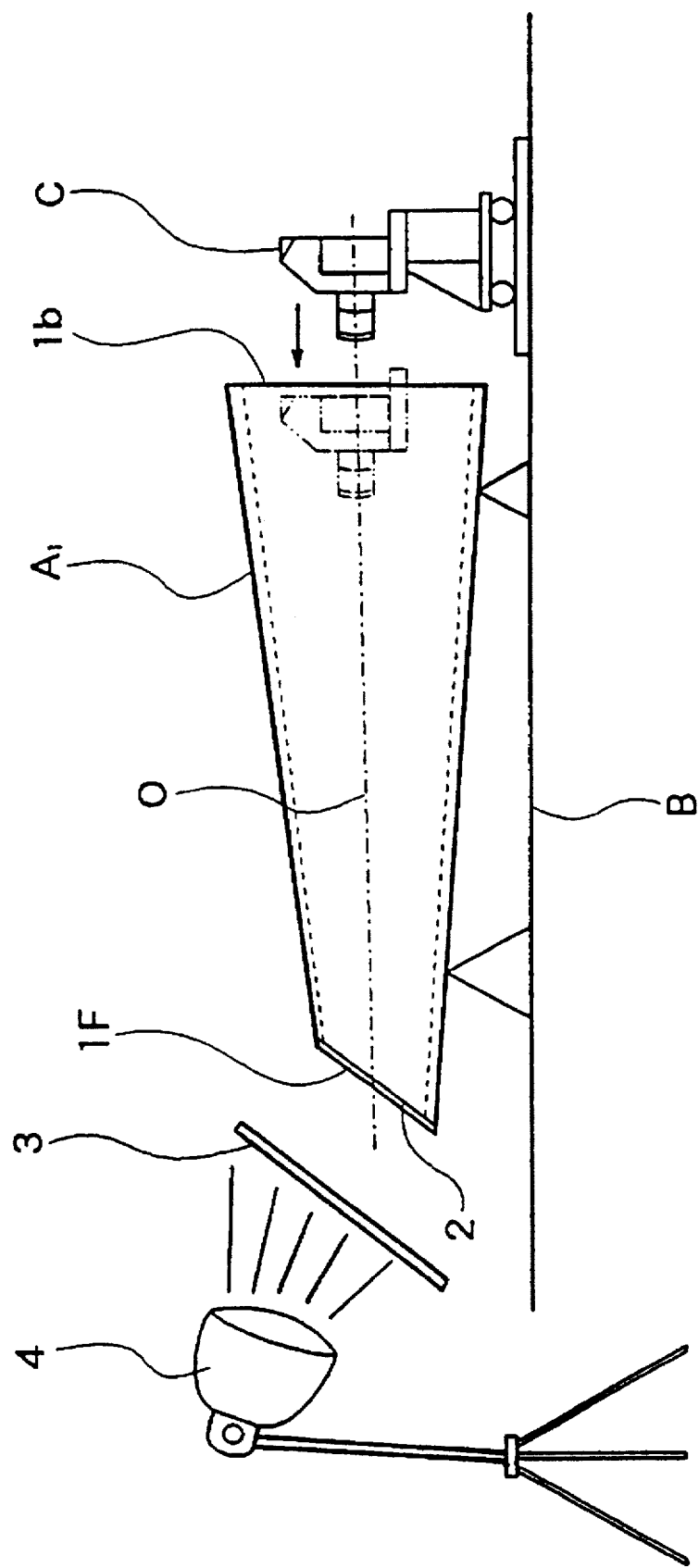
FIG. 2 is a side view showing the structure of a pattern generating apparatus utilizing the kaleidoscope shown in FIGS. 1A to 1C.

FIGS. 1A to 1C are views showing the structure of a kaleidoscope according to the present invention. FIG. 1A is a side view, FIG. 1B is a front view of the kaleidoscope viewed from the front, and FIG. 1C is a rear view of the kaleidoscope viewed from behind. FIG. 2 is a side view showing the structure of a pattern generating apparatus utilizing the kaleidoscope shown in FIGS. 1A to 1C.

In FIGS. 1A to 1C, denoted at 1 is a tip-cut triangle cone cylinder. The tip-cut triangle cone cylinder 1 is obtained by assembling plates 1A, whose inner surfaces 1M are mirror surfaces, into a triangle shape as viewed from the front or behind, so that the inner surfaces 1M are directed inside. The tip-cut triangle cone cylinder 1 is open at both ends 1a and 1b. A cut tip surface 1F having the smallest cross sectional area at the end 1a is formed in an inclined surface which is inclined with respect to the longitudinal direction of the tip-cut triangle cone cylinder 1, i.e., in an inclined surface which is inclined with respect to a central axis O, disposed equidistant from all sides of the tip-cut triangle cone cylinder 1, in the longitudinal direction. The angle of inclination $\alpha$ of the inclined surface (cut tip surface 1F) is about 30 degrees. Further, of the both ends 1a and 1b, the end 1a of the tip-cut triangle cone cylinder 1 measures 95 mm and the other end 1b of the tip-cut triangle cone cylinder 1 measures 210 mm. The length of the cylinder (total length) of the tip-cut triangle cone cylinder 1 is 900 mm, and the tip-cut triangle cone cylinder 1 is inclined at an angle of $\beta$. The angles of inclination $\alpha$ and $\beta$ are not limited to above, but rather, can be optionally set and somewhat variable depending on the angles.

Figure 3:
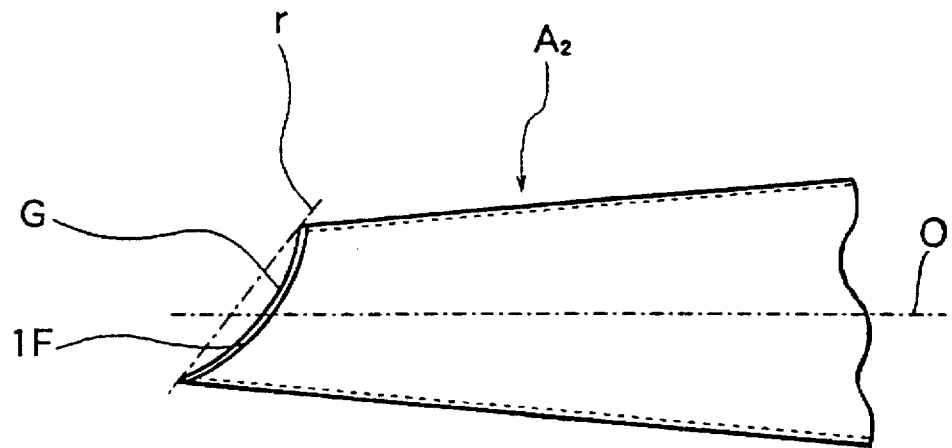
FIG. 3 is a side view showing a portion of a kaleidoscope which has a different cut tip surface from that of FIGS. 1A to 1C.

A positive film may be fixed to opening end of the cut tip surface 1F by an adhering means. In one embodiment, an adhesive double coated tape 2 serves as the adhering means. In another, more preferred embodiment, the adhering means may constitute a frame member attached to the cut tip surface 1F such that the frame member may be freely rotated or moved. By allowing the frame member to be rotatable or movable the user can more easily create a number of diversified patterns. Specifically, the frame member may be a guide plate G as shown in FIG. 3. The guide plate defines a gap in which the film can be placed. The guide plate G is used in place of adhesive double coated tape.

Since the kaleidoscope $A_1$ has a shape of a tip-cut triangle cone cylinder, the one end 1b having the largest cross section has a cross sectional area which increases in proportion to the size of the end 1a which serves as the cut tip surface.

Figure 4:
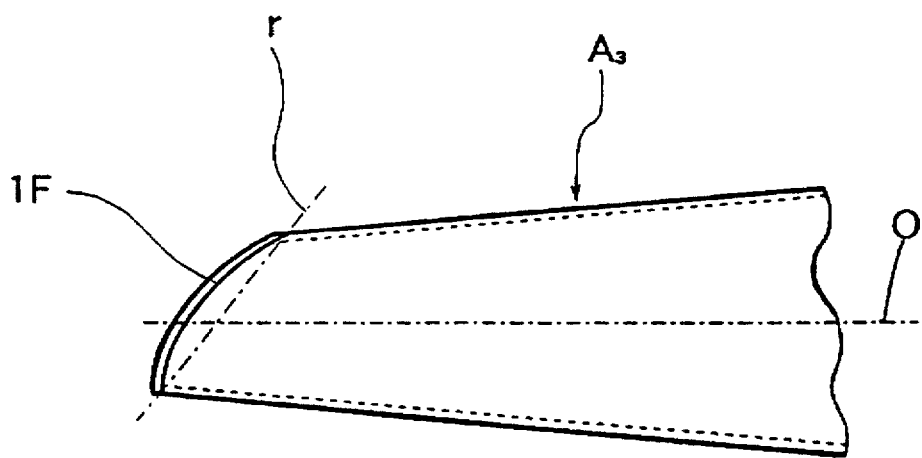
FIG. 4 is a side view showing a portion of a kaleidoscope which has a different cut tip surface from that of FIGS. 1A to 1C.

In addition to the kaleidoscope $A_1$ which is shown in FIG. 1, to create a different pattern, kaleidoscopes $A_2$ and $A_3$ having the cut tip surface 1F as that shown in FIG. 3 or 4 are prepared.

In the kaleidoscope $A_2$ of FIG. 3, the cut tip surface 1F is formed by an inclined surface (curved surface of a concave shape) which is warped in a concave shape with respect to the axis of original inclination (See the line r). In the kaleidoscope $A_3$ of FIG. 4, the cut tip surface 1F is formed by an inclined surface (curved surface of a convex shape) which is warped in a convex shape with respect to the axis of original inclination (See the line r). The kaleidoscope may be a kaleidoscope $A_4$ as that shown in FIG. 5 which is formed in the shape of a tip-cut rectangle cone cylinder. In the kaleidoscope $A_4$, the cut tip surface 1F is formed by an inclined surface which is inclined with respect to a center line O of the longitudinal direction.

The kaleidoscopes $A_1$, $A_2$ and $A_3$ (the kaleidoscope $A_4$ in this embodiment) shown in FIGS. 1, 3 and 4 (or 5) are each mounted on a mounting pedestal B of the pattern generating apparatus.

That is, in these kaleidoscopes $A_1$, $A_2$ and $A_3$ (the kaleidoscope $A_4$ shown in FIG. 5), a camera C (a large camera generally known as "4×5 camera" in this embodiment) which serves as the photographing means are selectively disposed on the mounting pedestal B for free movement in such a manner that the center line O approximately coincides with the center of the lens. A diffusion plate (a frosted glass plate or a screen) 3 is located approximately parallel to the cut tip surface 1F, in front of the cut tip surface 1F of the kaleidoscope $A_1$ (i.e., on the left side in FIG. 2). Further, in front of this (i.e., on the left side in FIG. 2), an adjustable illumination light (illuminating means) 4 is disposed so as to be freely movable with respect to the diffusion plate 3 or the kaleidoscope.

In the camera C, various wide angle lenses, standard lenses or telephotographic lenses are replaceable if necessary.

The pattern generating apparatus having the structure as described above, when used in the manner described below, creates a new pattern for the user of the kaleidoscope.

Figure 6:
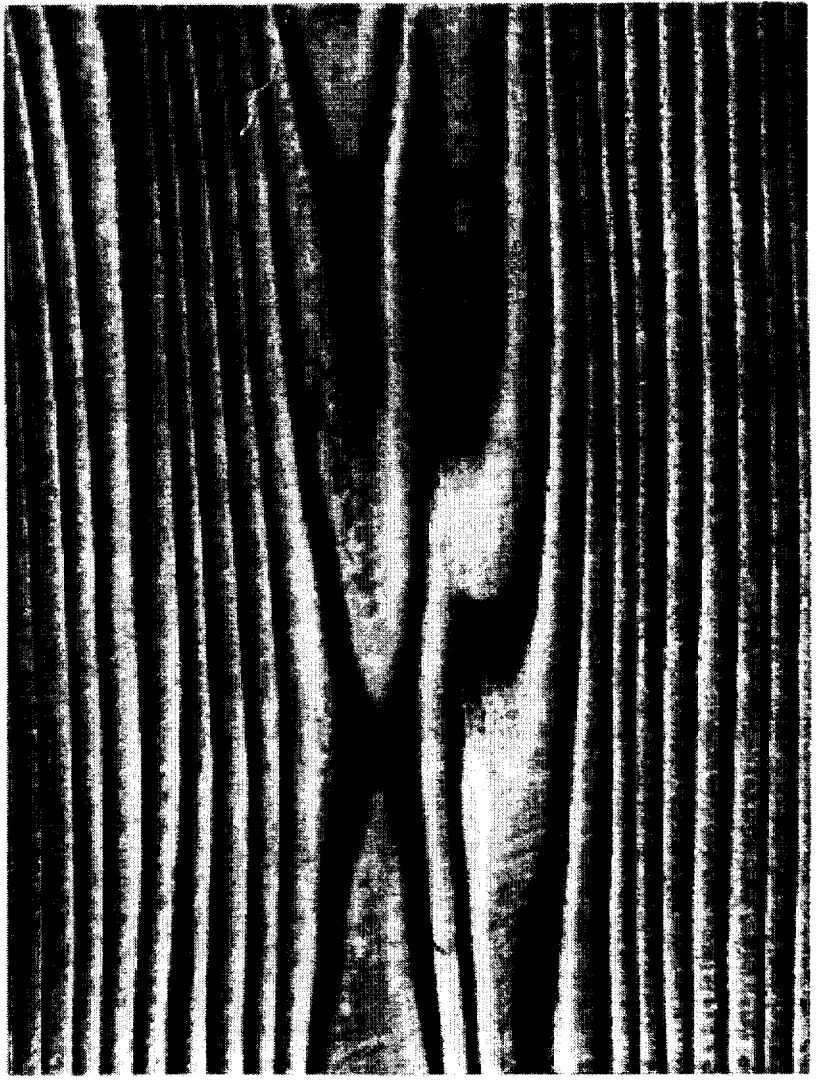
FIG. 6 is a view showing a pattern (grain pattern) which is created by an example of a positive film which is tightly adhered to a cut tip surface of a kaleidoscope.

To create a pattern using a positive film, as illustrated in the FIG. 6 grain pattern, the user adheres the edges of the film to the surface of the cut tip surface 1F in tight contact. The film is adhered to the cut tip surface 1F by the adhesive double coated tape 2 or some other form of adhering means, so that the film extends along the cut tip surface 1F and across the opening 1a.

Figure 7:
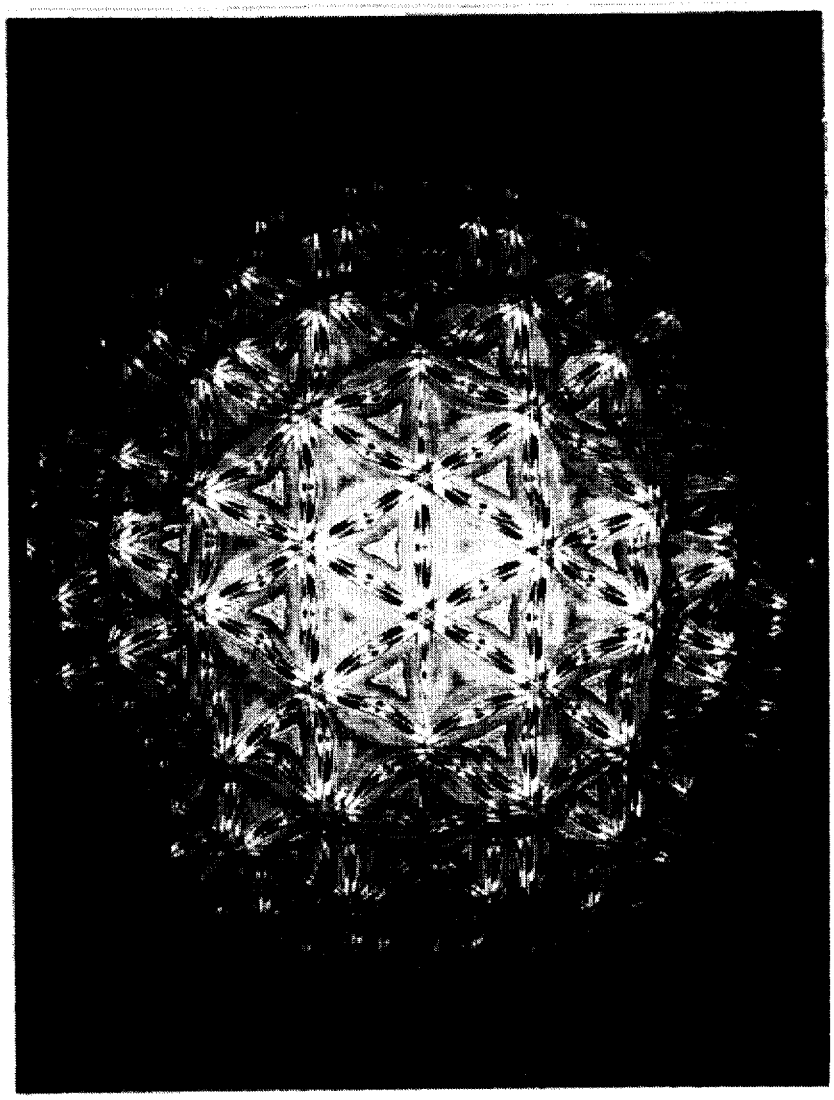
FIG. 7 is a view showing a pattern which is created by the positive film of FIG. 6 and a pattern generating apparatus which is equipped with the kaleidoscope of FIG. 1 and a 90-mm wide angle lens for 4×5 camera.

The illumination light 4 is turned on in this condition to illuminate from behind the film. The camera C is set on the side of the opening at the other end 1b of the kaleidoscope $A_1$ as shown in FIG. 2. When a person looks into through a viewfinder of the camera C, if a 90-mm wide angle lens for a 4×5 camera (which corresponds to a lens of about 18 mm for a 35-mm camera) is attached to the camera C, the person sees a spherical pattern which has hexagon cone projections formed on the periphery of the spherical pattern. See FIG. 7. The hexagon cone projections along the periphery of the spherical pattern are generated by the inclination of the cut tip surface 1F. The prior art kaleidoscopes employ a right angle tip surface, and these are not capable of generating spherical patterns with projections along the periphery of the spherical pattern. Instead, the prior art kaleidoscopes create flat surface spherical patterns. Further, when the camera C is moved from a position where the lens of the camera C is outside the opening 1b (denoted by the "solid line" camera in FIG. 2) to a position where the lens of the camera C is inside the opening 1b (denoted by the "dot-dot-line" camera in FIG. 2), the size of the pattern as shown in FIG. 7 is adjusted (increased in this case).

Figure 8:
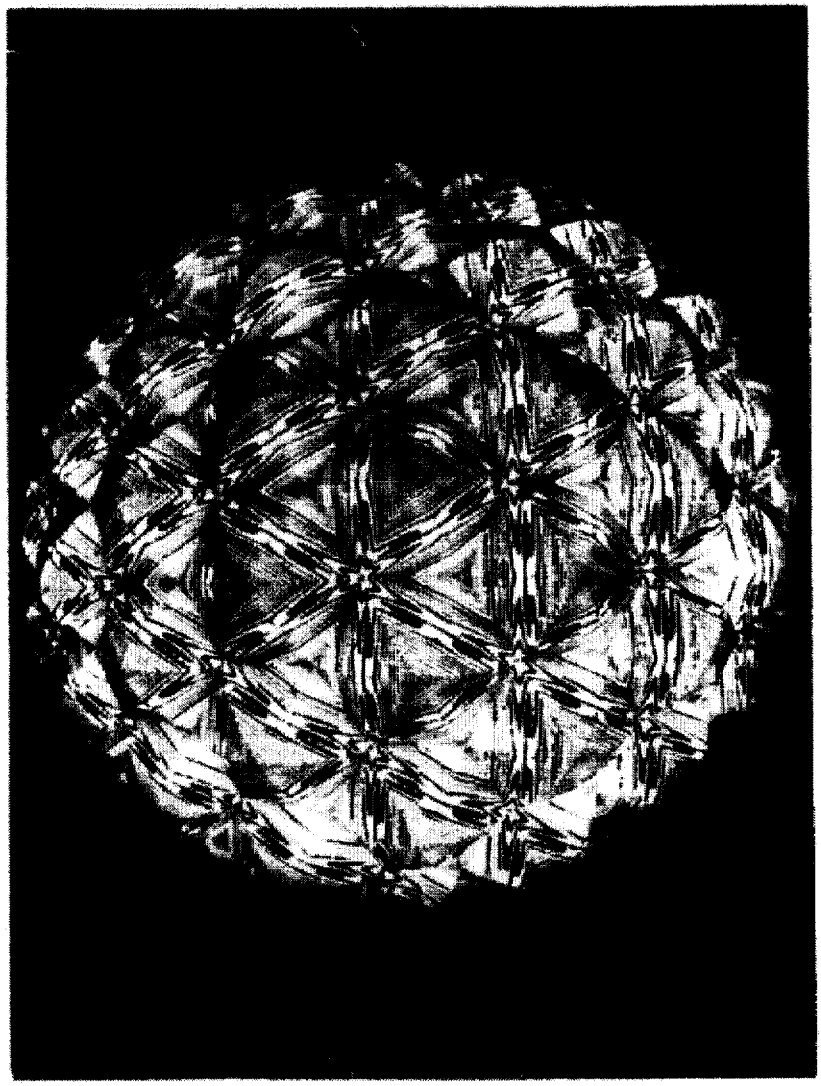
FIG. 8 is a view showing a pattern which is created by the positive film of FIG. 6 and a pattern generating apparatus which is equipped with the kaleidoscope of FIG. 3 and a 90-mm wide angle lens for 4×5 camera.

Next, the kaleidoscope $A_1$ is replaced with the kaleidoscope $A_2$, a spherical pattern which has semi-spherical projections formed on the periphery is created, as shown in FIG. 8.

Figure 9:
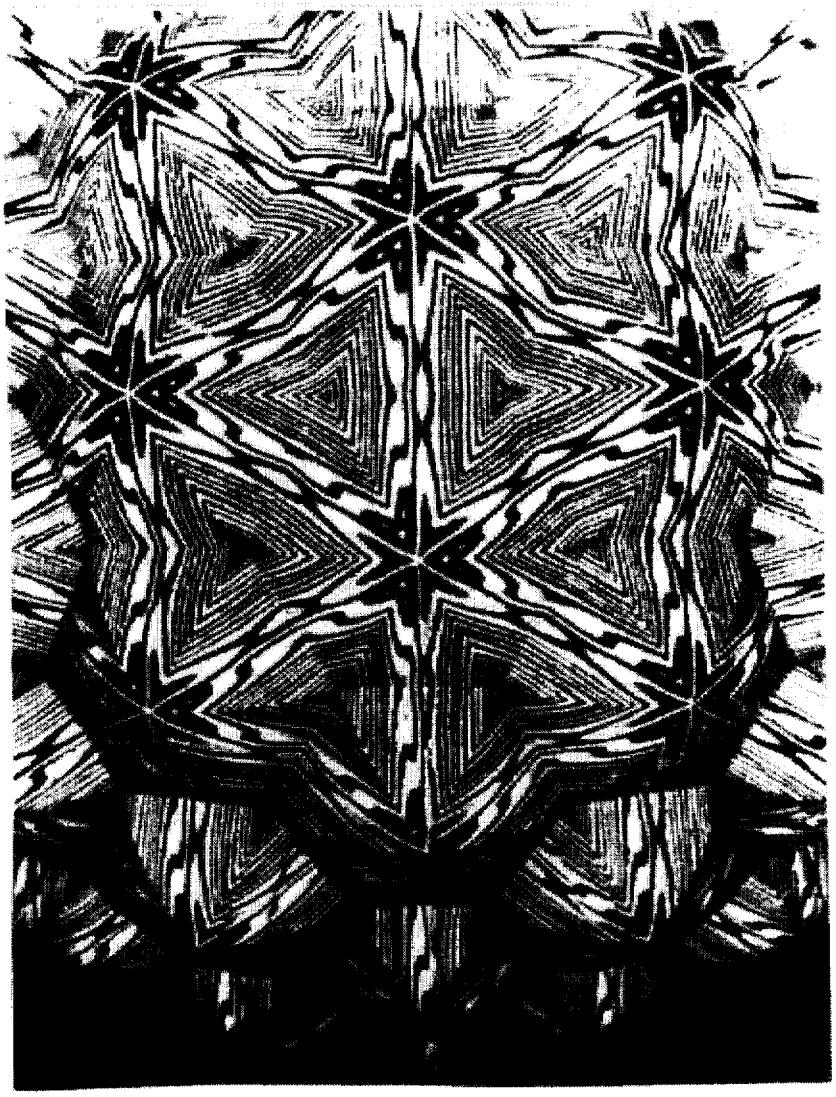
FIG. 9 is a view showing a pattern which is created by the positive film of FIG. 6 and a pattern generating apparatus which is equipped with the kaleidoscope of FIG. 3 and a 360-mm wide angle lens for 4×5 camera.

The replaceable lens of the camera C is replaced with a telephotographic lens of 360 mm for a 4×5 camera (which corresponds to about 120 mm for a 35-mm camera) in this condition. When a person looks into through a viewfinder, as shown in FIG. 9, the person sees a partially spherical pattern (a portion of a sphere) with semi-spherical projections formed on the surface. That is, in the pattern, similar grain patterns repeated toward the peripheral lines from the center of FIG. 9.

Figure 10:
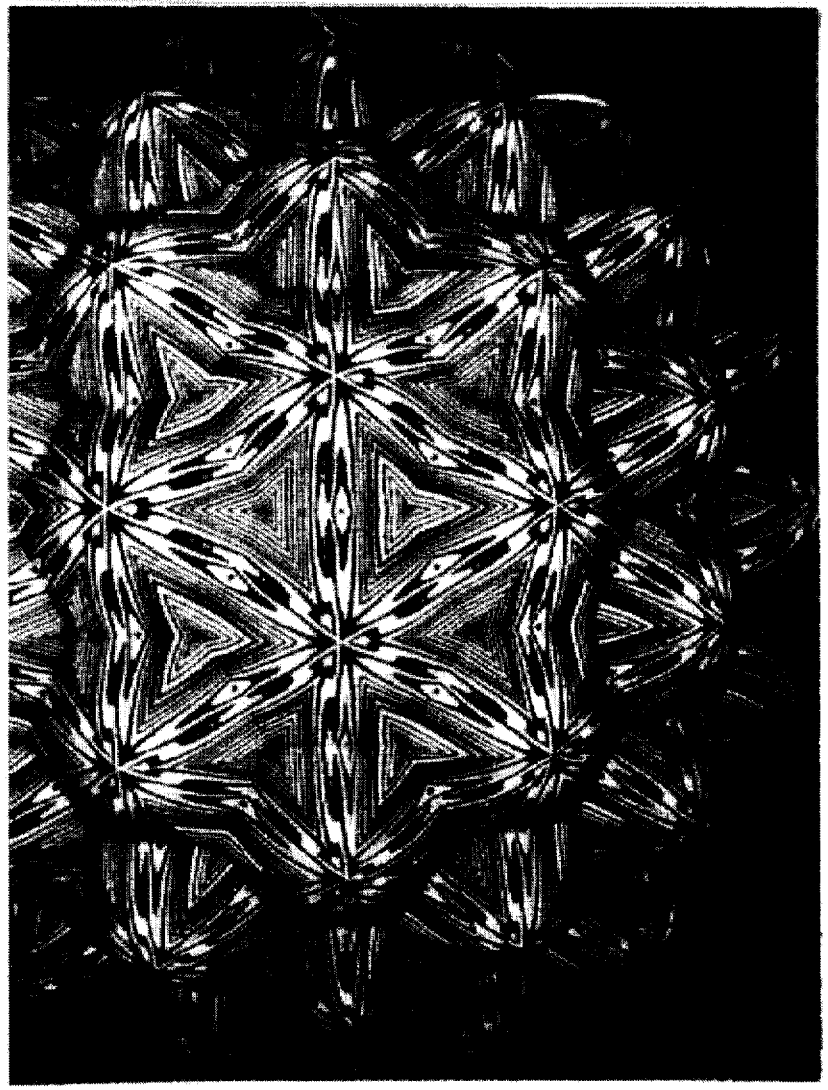
FIG. 10 is a view showing a pattern which is created by the positive film of FIG. 6 and a pattern generating apparatus which is equipped with the kaleidoscope of FIG. 3 and a 180-mm wide angle lens for 4×5 camera.

When the replaceable lens of the camera C is replaced with a standard lens of 180 mm for a 4×5 camera (which corresponds to about 50 mm for a 35-mm camera) in this condition and when a person looks into through a viewfinder, as shown in FIG. 10, the person sees a partially spherical pattern (a portion of a sphere) with semi-spherical projections formed on the surface, which corresponds to a portion of FIG. 9 as it is reduced in size. That is, in the pattern, similar grain patterns repeated toward the peripheral lines from the center of FIG. 9.

Figure 11:
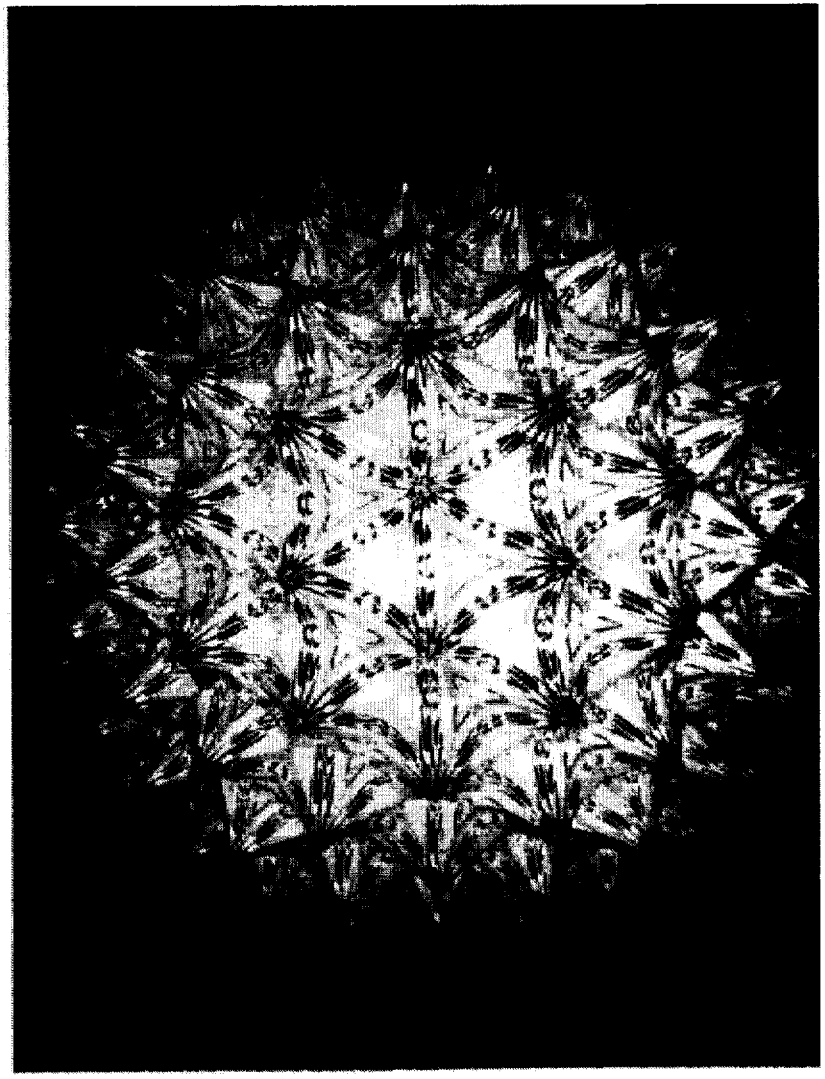
FIG. 11 is a view showing a pattern which is created by the positive film of FIG. 6 and a pattern generating apparatus which is equipped with the kaleidoscope of FIG. 4 and a 90-mm wide angle lens for 4×5 camera.

Further, when a person looks into through a viewfinder of a camera which is equipped with a wide angle lens of 90 mm for a 4×5 camera (which corresponds to about 18 mm for a 35-mm camera) after replacing the kaleidoscope $A_2$ with the kaleidoscope $A_3$, as shown in FIG. 11, the person sees a spherical pattern in which hexagon cone projections enclosed by concave edge lines are formed on the periphery.

The replaceable lens is replaced with a telephotographic lens of 360 mm for a 4×5 camera (which corresponds to about 120 mm for a 35-mm camera) in this condition. When a person looks into through a viewfinder of the camera C, as shown in FIG. 12, the person sees a partially spherical pattern (a portion of a sphere) in which hexagon cone projections enclosed by concave edge lines are formed on the surfaces.

Figure 12:
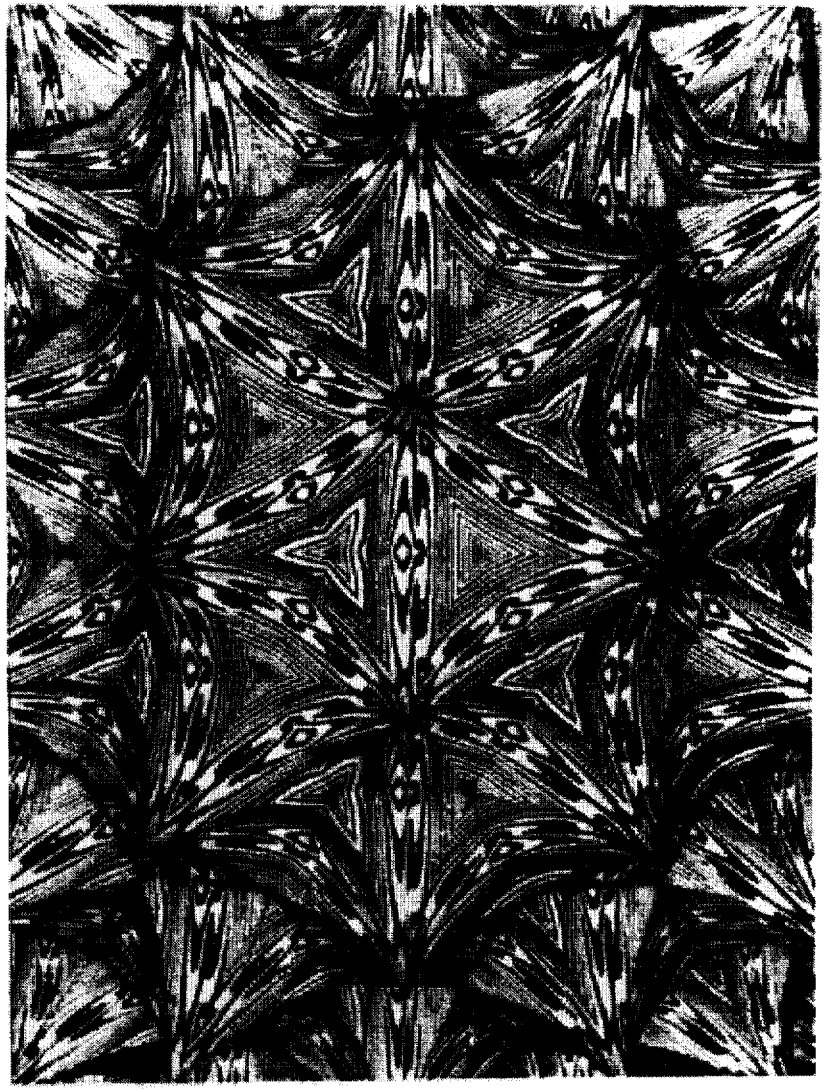
FIG. 12 is a view showing a pattern which is created by the positive film of FIG. 6 and a pattern generating apparatus which is equipped with the kaleidoscope of FIG. 4 and a 360-mm wide angle lens for 4×5 camera.
Figure 13:
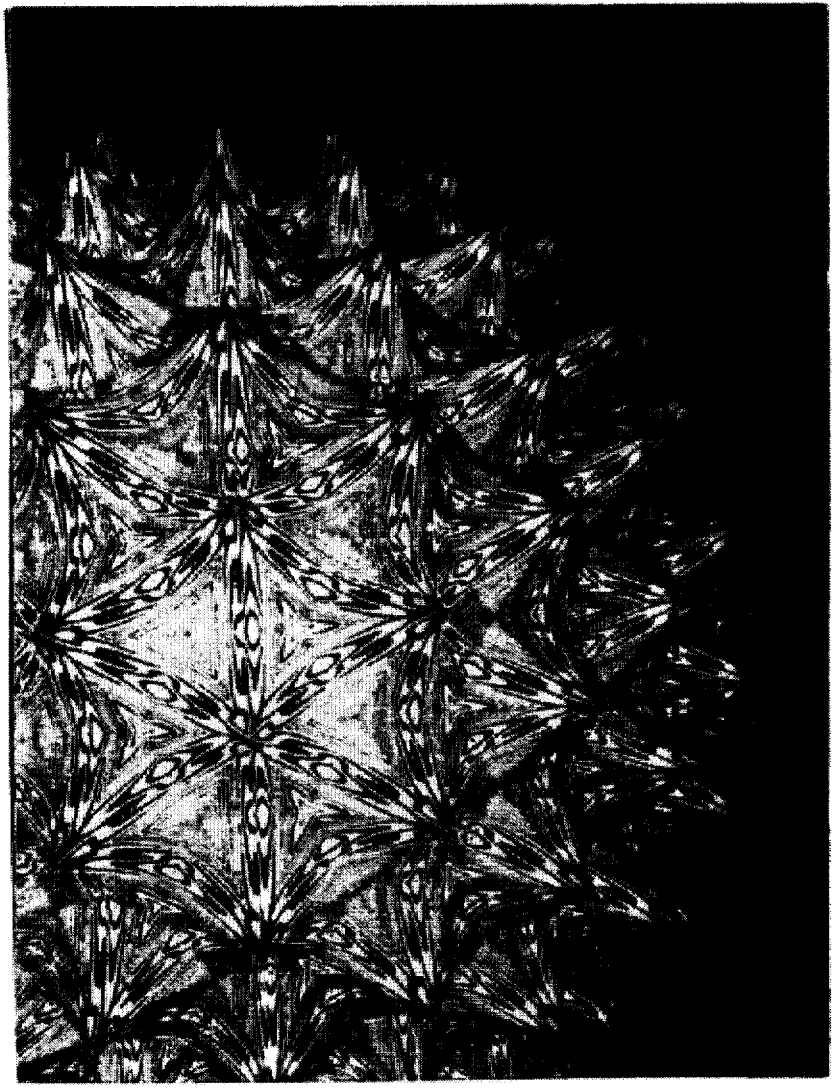
FIG. 13 is a view showing a pattern which is created by the positive film of FIG. 6 and a pattern generating apparatus which is equipped with the kaleidoscope of FIG. 4 and a 180-mm wide angle lens for 4×5 camera.

Further, if a person looks into through a viewfinder after replacing the replaceable lens of the camera C with a standard lens of 180 mm for a 4×5 camera (which corresponds to about 50 mm for a 35-mm camera), as shown in FIG. 13, the person sees a partially spherical pattern (a portion of a sphere) with hexagon cone projections having concave edge lines formed on the surfaces, which corresponds to a portion of FIG. 12 as it is reduced in size.

Figure 5:
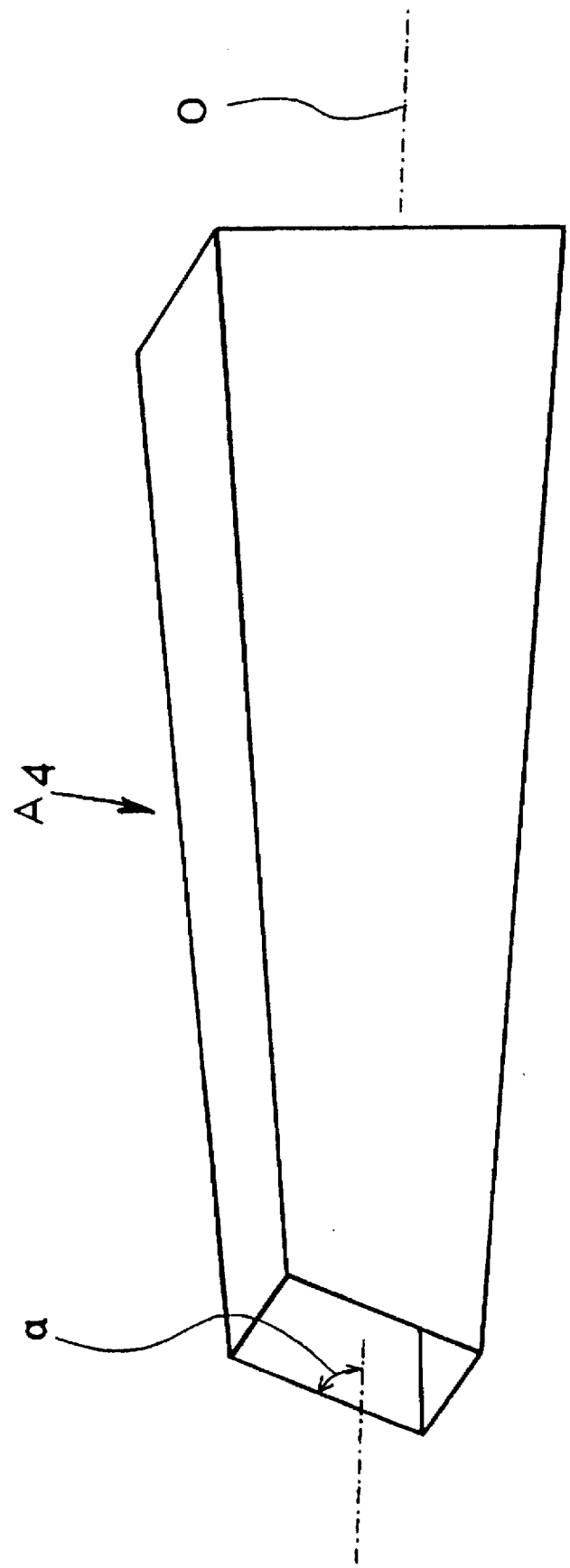
FIG. 5 is a perspective view of a kaleidoscope which is formed as a tip-cut rectangle cone cylinder according to other preferred embodiment, in which a cut tip surface is inclined as an inclined surface at an angle of inclination α=about 80 degrees with respect to a central axis O.
Figure 14:
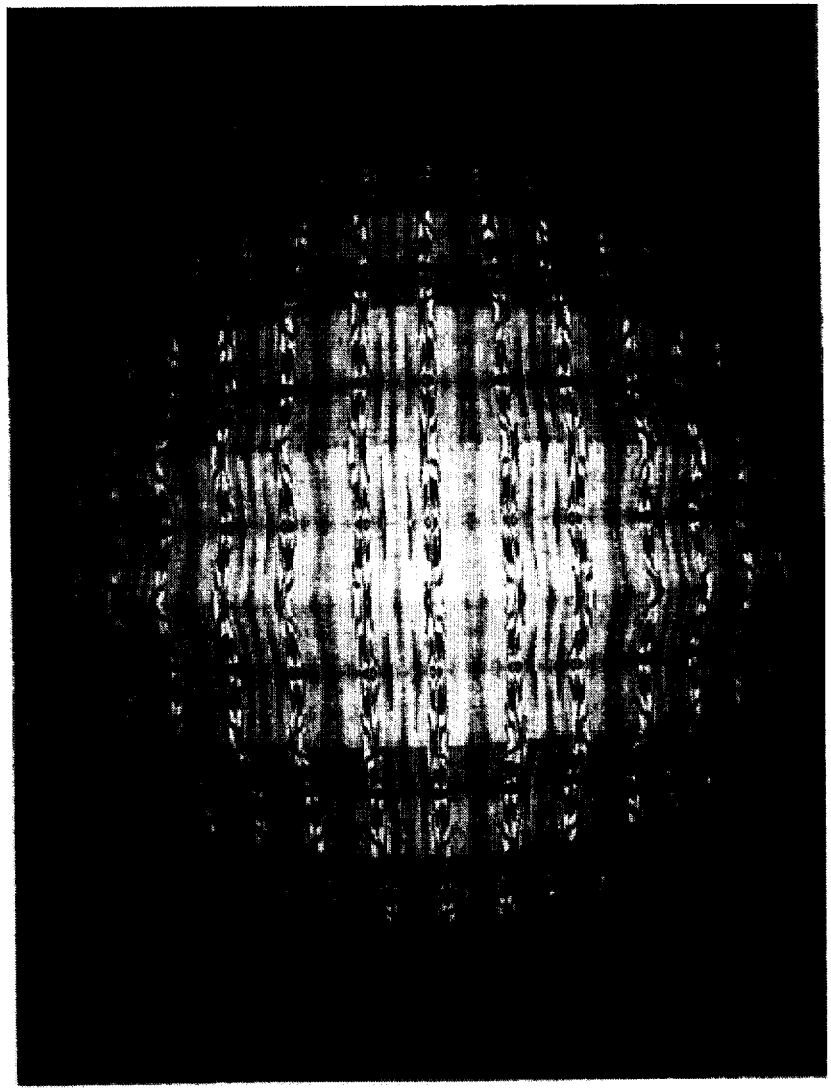
FIG. 14 is a view showing a pattern which is created by the positive film of FIG. 6 and a pattern generating apparatus which is equipped with the kaleidoscope of FIG. 5, which is formed as a tip-cut rectangle cone cylinder having a flat inclined surface which is inclined at the angle of inclination $\alpha$ is 80 degrees, and a 90-mm wide angle lens for 4×5 camera.

If the kaleidoscope $A_4$ shown in FIG. 5 is used with a 4×5 camera equipped with a wide angle lens of 90 mm (which corresponds to about 18 mm for a 35-mm camera) and a person looks into through a viewfinder of this camera, as shown in FIG. 14, the person sees an approximately spherical pattern with webs (binding) formed in the longitudinal direction (i.e., a vertical direction in FIG. 14) on each grain pattern.

Figure 15:
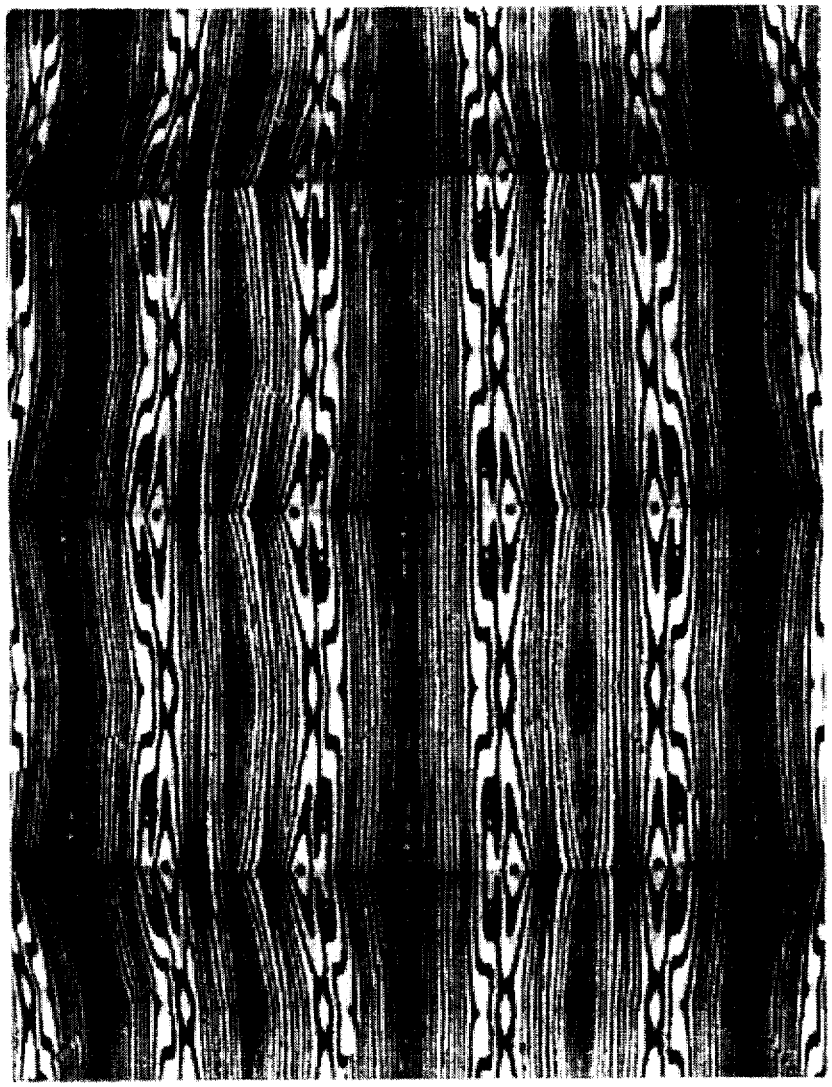
FIG. 15 is a view showing a pattern which is created by the positive film of FIG. 6 and a pattern generating apparatus which is equipped with a kaleidoscope, which is formed as a tip-cut rectangle cone cylinder having a flat inclined surface which is inclined at the angle of inclination $\alpha$ is 80 degrees, and a 360-mm wide angle lens for 4×5 camera.

Further, if the replaceable lens is replaced with a telephotographic lens of 360 mm for a 4×5 camera (which corresponds to about 120 mm for a 35-mm camera) and a person looks into through a viewfinder of the camera C, as shown in FIG. 15, the person sees a partially spherical pattern (i.e., of curved surface shape) in which webs (binding) are formed in the longitudinal direction on each pattern (grain pattern) which is reflected at the respective mirror surfaces.

Figure 16:
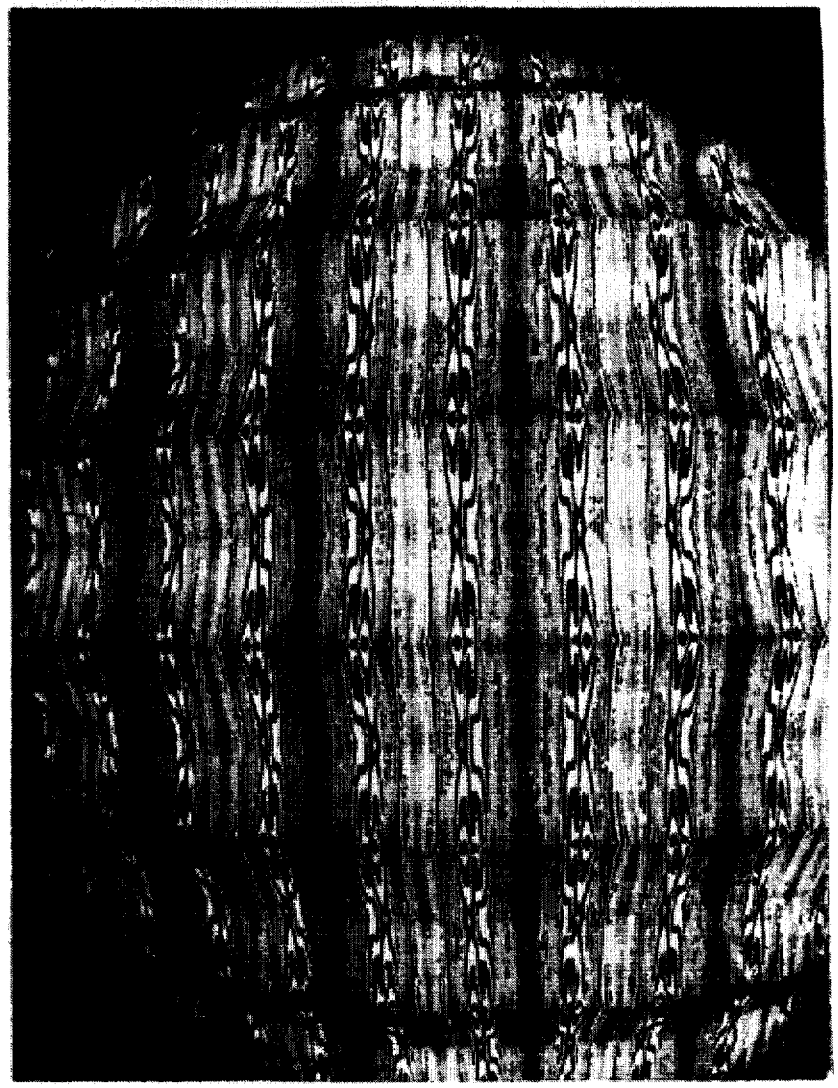
FIG. 16 is a view showing a pattern which is created by the positive film of FIG. 6 and a pattern generating apparatus which is equipped with a kaleidoscope, which is formed as a tip-cut rectangle cone cylinder having a flat inclined surface which is inclined at the angle of inclination $\alpha$ is 80 degrees, and a 180-mm wide angle lens for 4×5 camera.

Still further, if the replaceable lens is replaced with a standard lens of 180 mm for a 4×5 camera (which corresponds to about 50 mm for a 35-mm camera) and a person looks into through a viewfinder of the camera C, as shown in FIG. 16, the person sees a partially spherical pattern with webs (binding) formed in the longitudinal direction (i.e., a vertical direction in FIG. 16) on each pattern (grain pattern) which is reflected at the respective mirror surfaces, which corresponds to a portion of FIG. 15 as it is reduced in size.

Although not shown, when the film which is adhered to the cut tip surface 1F is rotated or moved, a pattern which gives a totally different impression is created.

Figure 17:
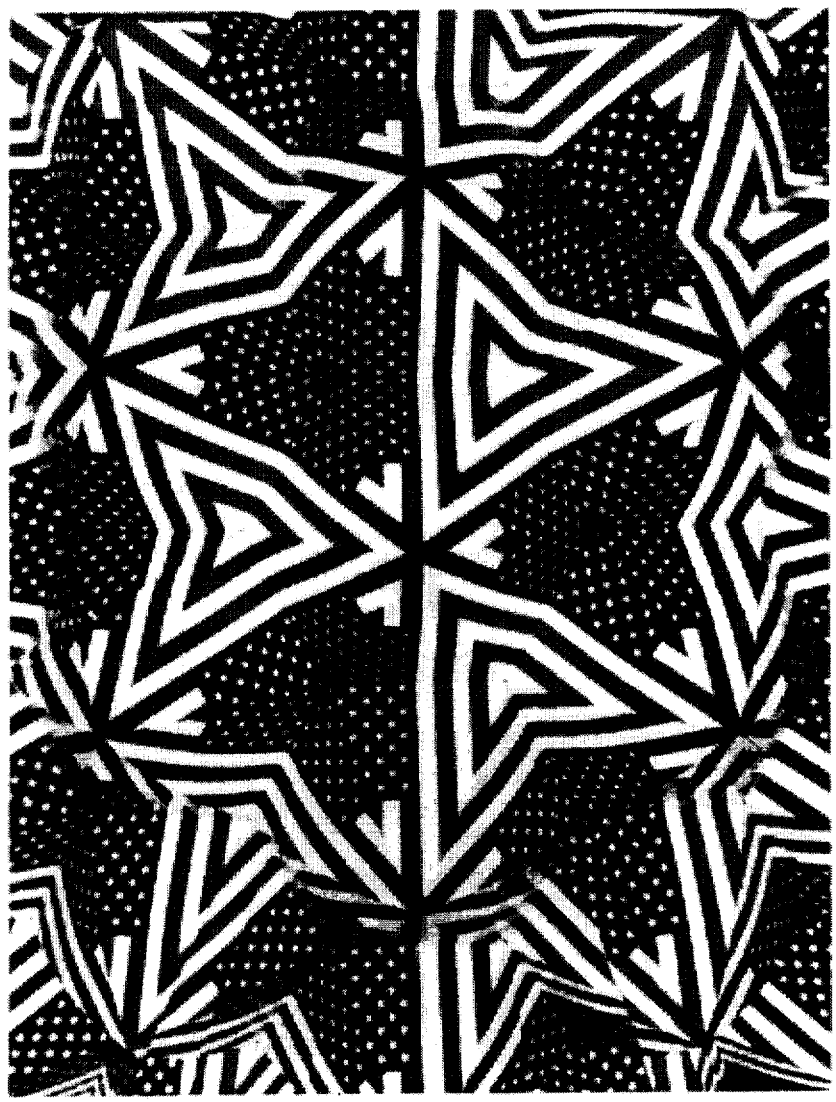
FIG. 17 is a view showing a pattern which is created by a positive film printing the Stars and the Stripes and a pattern generating apparatus which is equipped with the kaleidoscope of FIG. 1 and a 360-mm wide angle lens for 4×5 camera.

A pattern as that shown in FIG. 17 is created if the film above is replaced with a film printing of some other object, such as a film printing of the Stars and the Stripes. In this case as well, it is possible to create a pattern which gives a totally different impression, by rotating or moving the film.

Figure 18:
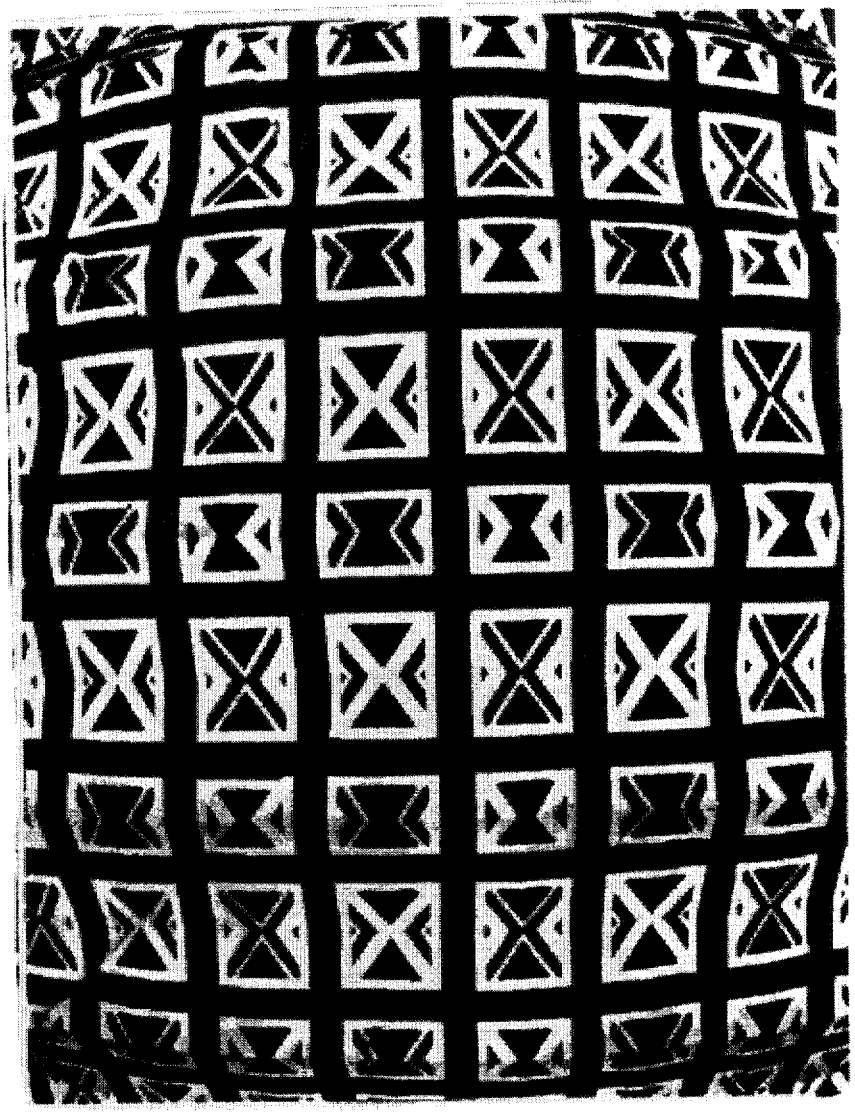
FIG. 18 is a view showing a pattern which is created, by a pattern generating apparatus which is equipped with a 180-mm wide angle lens for 4×5 camera, using a positive film printing the Union Jack adhered to a cut tip surface of a kaleidoscope which is formed as a tip-cut rectangle cone cylinder.

On the other hand, if a kaleidoscope formed as a tip-cut rectangle cone cylinder is used instead of the kaleidoscope formed as the tip-cut triangle cone cylinder as above and a film printing the Union Jack (national flag of England) is used as a film printing of an object, when a person looks into through a viewfinder of a camera which is equipped with a standard lens of 180 mm for a 4×5 camera (which corresponds to about 50 mm for a 35-mm camera), as shown in FIG. 18, the person sees a partially cylindrical pattern with webs (binding) formed on the top and the bottom.

Further, although not shown, when the kaleidoscope formed as the tip-cut triangle cone cylinder as above is replaced with a kaleidoscope formed as a tip-cut pentagon cone cylinder, the hexagon cone projections on the periphery shown in FIG. 7 are changed into patterns of decagon cone projections. If the kaleidoscope formed as the tip-cut triangle cone cylinder as above is replaced with a kaleidoscope formed as a tip-cut hexagon cone cylinder, the hexagon cone projections on the periphery shown in FIG. 7 are changed into patterns of dodecagon cone projections. Thus, the kaleidoscope according to the present invention is not limited to the tip-cut triangle cone cylinder shape. Rather, as far as the kaleidoscope is formed as a tip-cut polygon cone cylinder, the kaleidoscope may be a tip-cut polygon cone cylinder having more apexes, such as a tip-cut rectangle cone cylinder, a tip-cut pentagon cone cylinder and a tip-cut hexagon cone cylinder, and can each create unique patterns.

In addition, by changing the angles of inclination α of the cut tip portions (i.e., angle of the inclined surface) of the kaleidoscopes shown in FIGS. 1 to 3, it is possible to create a pattern in which the angle of the edge lines of the projections or the curvature of the spherical surfaces arranged as desired.

Moreover, by changing the angle β between the both ends of the kaleidoscope (i.e., the angle which determines the conical configuration of the cones of the tip-cut polygon cone cylinder; See FIG. 1A), it is possible to change the spherical shape of the sphere in three dimensions.

However, a pattern which is looked through the viewfinder of the camera C can be photographed with the camera as described above, and therefore, a film printing the pattern can be utilized in a print pattern of a fabric, a pattern on a poster, etc.

When the same "film printing the pattern" is utilized in this manner and the lens is appropriately replaced with a wide angle lens, a standard lens or a telephotographic lens or by moving or rotating the film on the cut tip surface 1F, or the shape or the angle α of the cut tip surface of the kaleidoscope or the angle of inclination β of the tip-cut polygon cone cylinder is changed, it is possible to optically create a pattern with almost a countless number of totally different pattern images and colors.

Further, by replacing the film itself described above (i.e., an object or a film obtained under a different photographing condition), namely, the grain pattern with an object printing of another grain pattern, a static object such as a national flag or a flower, scenery such as the Eiffel Tower, an airplane, etc., it is possible to create an infinite number of patterns in an easy manner.

In addition, creation of these patterns is easy as described above. Hence, a designer only has to select a favorite one of a countless number of patterns which are created by such an operation as above, based on his or her own feeling.

The kaleidoscope according to the present invention creates a pattern which gives a new and dynamic impression which has never been seen before.

In the pattern generating apparatus and the pattern generating method according to the present invention, utilizing the kaleidoscope described above, it is possible to easily and quickly create a newest ever pattern which has almost a countless number of totally different pattern images and colors.

While the invention has been described in detail, the foregoing description is in all aspects illustrative and not restrictive. It is understood that numerous other modifications and variations can be devised without departing from the scope of the invention.

I claim:

1. A pattern generating apparatus, comprising:
   a kaleidoscope;
   an adjustable, movable illuminating means;
   a film print;
   a movable photographing means; and
   wherein:
   the kaleidoscope comprises a tip-cut polygonal cone cylinder having interior mirrored surfaces, a longitudinal axis, an inclined tip-cut surface and a first opening formed at one end, a rear surface and a second opening formed at an opposite end, and an upper portion of the inclined tip-cut surface forms an acute angle with the longitudinal axis;
   the film print is disposed on the inclined tip-cut surface of the kaleidoscope by an adhering means;
   the illuminating means is disposed near the inclined tip-cut surface and behind the film print; and
   the photographing means is disposed near the rear surface of the polygonal cone cylinder.

2. The pattern generating apparatus of claim 1, wherein said adhering means is movable, such that the film print that the adhering means is connecting to the inclined tip-cut surface may be moved.

3. A pattern generating method, comprising:
   constructing a pattern generating apparatus including a kaleidoscope, an adjustable, movable illuminating means, a film print, a movable photographing means, wherein the kaleidoscope comprises a tip-cut polygonal cone cylinder having interior mirrored surfaces, a longitudinal axis, an inclined tip-cut surface and a first opening formed at one end, a rear surface and a second opening formed at an opposite end, and an upper portion of the inclined tip-cut surface forms an acute angle with the longitudinal axis; further wherein the film print is disposed on the inclined tip-cut surface of the kaleidoscope by an adhering means, the illuminating means is disposed near the inclined tip-cut surface and behind the film print, and the photographing means is disposed near the rear surface of the polygonal cone cylinder;
   looking through the photographing means;
   adjusting the position and the brightness of the illuminating means until reaching a desired lighting condition;
   moving the film print in the movable adhering means until finding a desired kaleidoscope pattern; and
   photographing the desired kaleidoscope pattern, whereby a film print of the desired pattern is created.

4. The pattern generating method of claim 3, further comprising, selecting and installing a lens for the photographing means before photographing the desired kaleidoscope pattern.

5. A kaleidoscope, comprising:
   at least three plate members;
   each plate member having a mirror surface, a tip-cut edge and an opposite edge;
   the at least three plate members being connected together to form a tip-cut polygonal cone cylinder having:
   a longitudinal axis;
   an axis of original inclination;
   an inclined tip-cut surface and a first opening formed by the interaction of the tip-cut edges of the plate members;

a rear surface and a second opening formed by the opposite edges of the plate members; and wherein an upper portion of the inclined tip-cut surface forms an acute angle with the longitudinal axis of the polygonal cone cylinder, and the inclined tip-cut surface is concave with respect to the axis of original inclination.

6. A kaleidoscope, comprising:

at least three plate members;

each plate member having a mirror surface, a tip-cut edge and an opposite edge;

the at least three plate members being connected together to form a tip-cut polygonal cone cylinder having:

a longitudinal axis;

an axis of original inclination;

an inclined tip-cut surface and a first opening formed by the interaction of the tip-cut edges of the plate members;

a rear surface and a second opening formed by the opposite edges of the plate members; and wherein an upper portion of the inclined tip-cut surface forms an acute angle with the longitudinal axis of the polygonal cone cylinder, and the inclined tip-cut surface is convex with respect to the axis of original inclination.

* * * * *